(12) United States Patent
Takada et al.

(10) Patent No.: US 8,546,495 B2
(45) Date of Patent: Oct. 1, 2013

(54) POLYANILINE-ADDED PREPOLYMER, METHOD OF MANUFACTURING POLYANILINE-ADDED PREPOLYMER, POLYANILINE GRAFT POLYMER, METHOD OF MANUFACTURING POLYANILINE GRAFT POLYMER, CROSS-LINKED MATERIAL, AND PAINT

(75) Inventors: Yu Takada, Toyota (JP); Masahiko Ishii, Okazaki (JP); Yukio Dohi, Amagasaki (JP); Aki Yuguchi, Amagasaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 235 days.

(21) Appl. No.: 13/146,658

(22) PCT Filed: Jan. 27, 2010

(86) PCT No.: PCT/IB2010/000135
§ 371 (c)(1),
(2), (4) Date: Jul. 28, 2011

(87) PCT Pub. No.: WO2010/086707
PCT Pub. Date: Aug. 5, 2010

(65) Prior Publication Data
US 2011/0281997 A1    Nov. 17, 2011

(30) Foreign Application Priority Data
Jan. 29, 2009   (JP) .................................. 2009-018825

(51) Int. Cl.
*C08F 283/00*   (2006.01)
*C08G 73/02*    (2006.01)
*C08G 73/06*    (2006.01)

(52) U.S. Cl.
USPC ............................................ 525/540; 528/423

(58) Field of Classification Search
USPC ......................................... 525/540; 528/423
See application file for complete search history.

(56) References Cited

U.S. PATENT DOCUMENTS

| | | | | | |
|---|---|---|---|---|---|
| 5,100,977 | A | * | 3/1992 | Oka | 525/540 |
| 5,237,023 | A | | 8/1993 | Oka | |
| 5,250,639 | A | * | 10/1993 | Oka | 525/540 |
| 5,254,670 | A | * | 10/1993 | Oka | 528/373 |

(Continued)

FOREIGN PATENT DOCUMENTS

| | | |
|---|---|---|
| EP | 0 753 550 A1 | 1/1997 |
| JP | 6-100691 | 4/1994 |

(Continued)

OTHER PUBLICATIONS

Abe, M. et al., "Soluble and High Molecular Weight Polyaniline," J. Chem. Soc., Chem. Commun., 1989, pp. 1736-1738.

(Continued)

*Primary Examiner* — Mike M Dollinger
(74) *Attorney, Agent, or Firm* — Finnegan, Hendersion, Farabow, Garrett & Dunner, LLP

(57) ABSTRACT

Polyaniline is added into a glycidyl group- or isocyanate group-containing (meth)acrylate to obtain a polyaniline-added prepolymer, and then the obtained polyaniline-added prepolymer and another unsaturated group-containing monomer undergo additive copolymerization at their respective double bonds to obtain a polyaniline graft polymer having a weight-average molecular weight of 1,000 to 100,000.

8 Claims, 10 Drawing Sheets

NMR OF PANI ONLY

(56) References Cited

U.S. PATENT DOCUMENTS

| | | | | |
|---|---|---|---|---|
| 5,304,613 | A | * | 4/1994 | Oka .............................. 525/540 |
| 5,574,131 | A | * | 11/1996 | Oka .............................. 528/422 |
| 5,756,601 | A | * | 5/1998 | Chen et al. .................... 525/540 |
| 5,821,309 | A | * | 10/1998 | Oka .............................. 525/540 |
| 5,976,419 | A | | 11/1999 | Hawkins et al. |
| 6,054,514 | A | | 4/2000 | Kulkarni |
| 6,254,980 | B1 | | 7/2001 | Tadokoro et al. |
| 6,391,509 | B1 | * | 5/2002 | Drappel et al. .......... 430/111.35 |
| 6,440,332 | B1 | | 8/2002 | Geer et al. |
| 6,972,098 | B1 | | 12/2005 | Viswanathan |
| 7,968,009 | B2 | * | 6/2011 | Reynaud et al. .............. 252/500 |
| 2002/0195592 | A1 | | 12/2002 | Geer et al. |
| 2006/0235169 | A1 | * | 10/2006 | Yamasaki ..................... 525/540 |

FOREIGN PATENT DOCUMENTS

| | | |
|---|---|---|
| JP | 7-118607 | 5/1995 |
| JP | 10-92220 | 4/1998 |
| JP | 2006-13175 | 1/2006 |
| WO | WO 2006/096550 A | 9/2006 |

OTHER PUBLICATIONS

International Search Report in International Application No. PCT/IB2010/000135; Mailing Date: May 25, 2010.

Written Opinion of the International Searching Authority in International Application No. PCT/IB2010/000135; Mailing Date: May 25, 2010.

Applicant's Response to the Written Opinion of the International Searching Authority in International Application No. PCT/IB2010/000135 (Nov. 11, 2010).

* cited by examiner

NMR OF PANI ONLY

NMR OF PANI ONLY

NMR OF PANI-GMA

NMR OF PANI-GMA/HEMA

NMR OF PANI-GMA/MMA

NMR OF PANI-GMA/BMA

ABSORPTION OF NCO AT 3 DISAPPEARED
⇒OH OF HEMA REACTED WITH NCO

POLYANILINE-ADDED PREPOLYMER, METHOD OF MANUFACTURING POLYANILINE-ADDED PREPOLYMER, POLYANILINE GRAFT POLYMER, METHOD OF MANUFACTURING POLYANILINE GRAFT POLYMER, CROSS-LINKED MATERIAL, AND PAINT

CROSS-REFERENCE TO RELATED APPLICATIONS

This application is a national phase application of International Application No. PCT/IB2010/000135, filed Jan. 27, 2010, and claims the priority of Japanese Application No. 2009-018825, filed Jan. 29, 2009, the contents of both of which are incorporated herein by reference.

BACKGROUND OF THE INVENTION

1. Field of the Invention

The invention relates to a new polyaniline-added prepolymer and a method of manufacturing the polyaniline-added prepolymer. In addition, the invention relates to a polyaniline graft polymer that is obtained by addition-polymerizing the polyaniline-added prepolymers and a method of manufacturing the polyaniline graft polymer. In addition, the invention relates to a three-dimensional cross-linked material of a polyaniline graft polymer. Furthermore, the invention relates to a paint that contains the polyaniline graft polymer or the three-dimensional cross-linked material of the polyaniline graft polymer as a coating component.

2. Description of the Related Art

Polyaniline (PANI) is also called aniline black, and is a black powdery polymeric substance that is obtained in such a manner that aniline undergoes oxidative chemical polymerization or electrochemical polymerization. Polyaniline is a conductive polymer, so, in recent years, application of polyaniline to wide fields, such as an electrode material of a battery, an antistatic material, an electromagnetic wave shielding material, a photoelectron conversion device, an optical memory, functional devices of various sensors, or the like, a display device, various hybrid materials, a transparent conductor and various terminal equipments, has been studied as a new electronic material or conductive material.

However, generally, polyaniline has a highly developed p-conjugated system. The polymer principal chain is rigid, and the interaction between molecular chains is strong. In addition, a large number of strong hydrogen bonds are present between the molecular chains, so polyaniline is insoluble in almost all organic solvents. In addition, polyaniline does not melt even when it is heated, so it has poor formability and it is difficult to be made as a film, or the like. Therefore, according to a related art, monomers are impregnated into a base material, such as a fiber or porous body of a polymeric material having a desired shape, and then the monomers are brought into contact with an adequate polymerization catalyst to be polymerized by electrolytic oxidation or monomers are polymerized in the presence of thermoplastic polymer powder to obtain an electroconductive composite.

J. Chem. Soc., Chem. Commun., 1989, 1736 describes a polyaniline that is synthesized by selecting a polymerization catalyst and a reaction, temperature and is soluble in N-methyl-2-pyrrolidone. However, this polyaniline is also almost insoluble in other general organic solvents, and the adaptive range of the polyaniline is limited. In addition, various aniline derivatives are used to synthesize polyaniline derivatives that are soluble in an organic solvent; however, a film having a sufficient flexibility has not yet been made. Furthermore, introduction of substituents, such as alkyl chain, has also been studied; however, this causes a decrease in heat resistance of polyaniline into which these substituents are introduced.

Japanese Patent Application Publication No. 6-100691 (JP-A-6-100691) describes a polyaniline derivative having a graft structure. Polyaniline is caused to react with polysiloxane that has a group reacting with an amino group at a terminal. Thus, the polyaniline derivative is able to dissolve or swell in an organic solvent and is able to form a flexible self-supported film or fiber having high heat resistance. However, this polyaniline derivative is formed so that any one of or both of a quinodiimine structural unit and an imino-1,4-phenylene structural unit is randomly combined with an N-polysiloxane graft-imino-1,4-phenylene structural unit. Therefore, a method of manufacturing the polyaniline is complicated, and, in addition, the polyaniline does not have a solvent dispersibility and long-term dispersion stability that are necessary when used for paint, or the like.

On the other hand, the polyaniline has the function of passivating an iron surface. Focusing on that function, application of polyaniline to an anticorrosive paint has also been studied. However, as described above, polyaniline is an insoluble polymer, and basically does not dissolve in a solvent except part of solvents (N-methyl-2-pyrrolidone, or the like). Then, such a method is mainly used that, when applied to an anticorrosive paint, a bulk of polymer is physically crushed to reduce a particle diameter and then mixed with paint. However, there is a limit to reduce a particle diameter by physically crushing a bulk of polymer. Thus, stability of polyaniline decreases in the paint, and particles eventually precipitate to separate from the paint. Furthermore, dispersion of polyaniline is insufficient in the coating.

As described above, polyaniline is a material that has been difficult to be handled when used as a paint.

SUMMARY OF THE INVENTION

The invention provides a synthetic material as an intermediate in manufacturing a polyaniline graft polymer. The invention provides a polyaniline graft polymer that is stably disperses or dissolves in various solvents for a long term and that is able to form a coating or a self-supported film. In addition, the invention provides a paint that contains the polyaniline graft polymer that takes advantage of these properties as a coating component.

That is, the invention provides a new polyaniline-added prepolymer and a method of manufacturing the polyaniline-added prepolymer, a polyaniline graft polymer that is obtained by addition-polymerizing the polyaniline-added polymers and a method of manufacturing the polyaniline graft polymer, and a paint that contains the polyaniline graft polymer as a coating component.

A first aspect of the invention relates to a polyaniline-added prepolymer that comprises a (meth)acrylate that contains a glycidyl group or an isocyanate group and to which polyaniline is added.

In the polyaniline-added prepolymer according to the above aspect, the (meth)acrylate that contains the glycidyl group may be a glycidyl(meth)acrylate, and the (meth)acrylate that contains the isocyanate group may be a 2-isocyanate ethyl(meth)acrylate.

A second aspect of the invention relates to a method of manufacturing a polyaniline-added prepolymer. The method includes adding polyaniline into a (meth)acrylate that contains a glycidyl group or an isocyanate group.

In the method according to the above aspect, the (meth) acrylate that contains the glycidyl group may be a glycidyl (meth)acrylate, and the (meth)acrylate that contains the isocyanate group may be a 2-isocyanate ethyl(meth)acrylate.

A third aspect of the invention relates to a polyaniline graft polymer. The polyaniline graft polymer comprises: a polyaniline-added prepolymer which comprises a (meth)acrylate that contains a glycidyl group or an isocyanate group and to which polyaniline is added; and another monomer that contains an unsaturated group and that undergoes additive copolymerization with the polyaniline-added prepolymer. In the polyaniline graft polymer according to the above aspect, the additive copolymerization is carried out between double bonds of the glycidyl group or isocyanate group and double bonds of the unsaturated group.

The polyaniline graft polymer according to the above aspect may have a weight-average molecular weight of 1,000 to 100,000.

In the polyaniline graft polymer, the (meth)acrylate that contains the glycidyl group may be a glycidyl(meth)acrylate, and the (meth)acrylate that contains the isocyanate group may be a 2-isocyanate ethyl(meth)acrylate.

In the polyaniline graft polymer according to the above aspect, the another monomer may be selected from the group consisting of 2-hydroxyethyl(meth)acrylate (HE(M)A), methyl(meth)acrylate (M(M)A), butyl(meth)acrylate (B(M)A) and acrylic acid (AA).

A fourth aspect of the invention relates to a method of manufacturing a polyaniline graft polymer. The method includes: synthesizing a polyaniline-added prepolymer by adding polyaniline into a (meth)acrylate that contains a glycidyl group or an isocyanate group; and carrying out additive copolymerization of the synthesized polyaniline-added prepolymer and another monomer that contains an unsaturated group. In this method, the additive copolymerization is carried out between double bonds of the glycidyl group or isocyanate group and double bonds of the unsaturated group.

In the method according to the above aspect, the (meth) acrylate that contains the glycidyl group may be a glycidyl (meth)acrylate, and the (meth)acrylate that contains the isocyanate group may be a 2-isocyanate ethyl(meth)acrylate.

In the method according to the above aspect, the another monomer may be selected from the group consisting of 2-hydroxyethyl(meth)acrylate, methyl(meth)acrylate, butyl (meth)acrylate and acrylic acid.

A fifth aspect of the invention relates to a cross-linked material that includes the polyaniline graft polymers according to the third aspect, cross-linked by a di-isocyanate compound. With the above configuration, the cross-linked material has an improved solvent resistance against THF, or the like.

The polyaniline graft polymer according to the third aspect or the cross-linked material according to the fifth aspect may be contained in a coating forming component of a paint. With the above configuration, it is possible to provide a paint that exhibits the anticorrosive property of polyaniline.

The polyaniline graft polymer according to the aspect of the invention is able to form a long-term stable and self-supported film that is dispersible or soluble in various solvents. Therefore, particularly, the polyaniline graft polymer may be used as a coating component of an anticorrosive paint. In addition, coatings and films formed of the polyaniline graft polymer exhibit high electrical conductivity through doping, so the coatings and films are remarkably useful in various applications, such as an electronic material and a conductive material.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
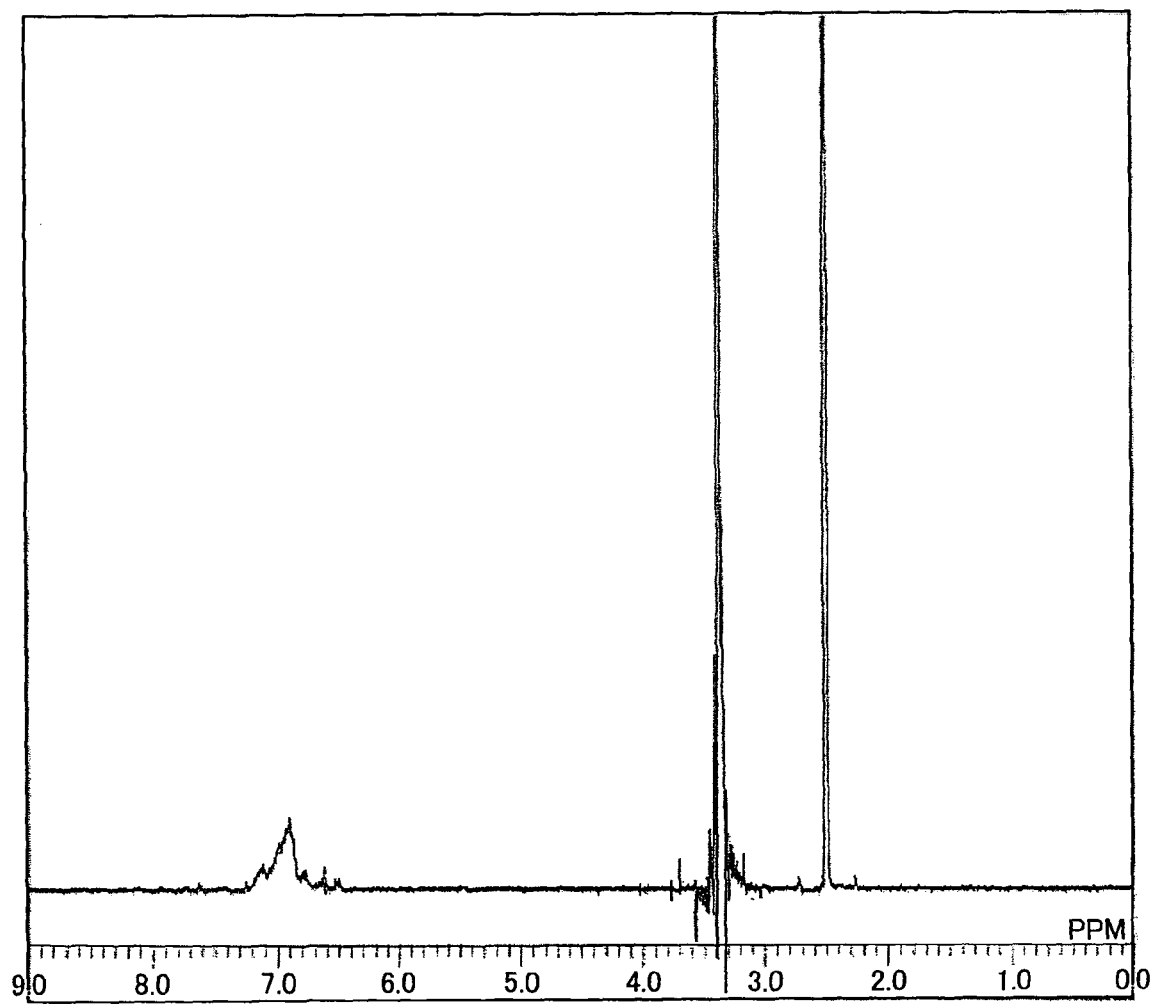
FIG. 1 shows an NMR of PANI only.

The inventors manufactured a polyaniline graft polymer having a specific structure using a polyaniline-added prepolymer as an intermediate.

A polyaniline-added prepolymer according to an embodiment of the invention will be described. In the embodiment of the invention, the "polyaniline-added prepolymer" is a substance that is obtained through addition of polyaniline into glycidyl group- or isocyanate group-containing (meth)acrylate. The "addition" means that the (meth)acrylate and polyaniline are chemically coupled by covalent bonding. Specifically, in the case of a glycidyl group-containing (meth) acrylate, the addition means that the glycidyl group of the (meth)acrylate is coupled to the amino group ($NH_2$ group) and/or imino group (—NH— group) of the polyaniline through reaction. In addition, in the case of an isocyanate group-containing (meth)acrylate, the isocyanate group of the (meth)acrylate is coupled to the amino group and/or imino group of the polyaniline through reaction. The polyaniline-added prepolymer according to the embodiment of the invention serves as an intermediate for synthesizing a polyaniline graft polymer, which will be described later.

The "glycidyl group-containing (meth)acrylate according to the embodiment of the invention may be, for example, glycidyl(meth)acrylate (G(M)A).

In addition, the "isocyanate group-containing (meth)acrylate" according to the embodiment of the invention may be, for example, a 2-isocyanate ethyl(meth)acrylate or 2-methacryloyloxyethyl isocyanate (MOI).

With the polyaniline-added prepolymer according to the embodiment of the invention, it is possible to provide a synthesizing material as an intermediate in manufacturing the polyaniline graft polymer according to the embodiment of the invention. In addition, the polyaniline-added prepolymer according to the present embodiment may be dissolved in N-methyl-2-pyrrolidone (NMP) or dimethyl sulfoxide (DMSO) as will be described in examples later. This advantage eases manufacturing, and, as in the case of the polyaniline graft polymer which will be described later, the polyaniline-added prepolymer may be used as a coating component of an anticorrosive or electroconductive paint.

In manufacturing the polyaniline-added prepolymer according to the embodiment of the invention, polyaniline used as a starting material may be obtained by a known method. For example, the polyaniline may be obtained in such a manner that ammonium persulfate, or the like, is used as an oxidizing agent to oxidatively polymerize aniline at a low temperature, for example, at a temperature range of −20 to 50° C.

In manufacturing a polyaniline-added prepolymer according to a first embodiment of the invention, addition of polyaniline into glycidyl group-containing (meth)acrylate is achieved through reaction between the glycidyl group of the glycidyl group-containing (meth)acrylate and the amino group and/or imino group of the polyaniline. In this reaction, excessive amounts of the glycidyl group-containing (meth)acrylate may be added with respect to the polyaniline. The specific mixture mole ratio between both chemical compounds is, for example, such that the ratio of glycidyl group-containing (meth)acrylate to polyaniline is desirably 500 to 2500:1, more desirably, 1000 to 2000:1 or 1500 to 1800:1. The reaction temperature is desirably 80° C. to 120° C., more desirably, 90° C. to 110° C., and further desirably, 95° C. to 100° C. In addition, the reaction duration is desirably one hour to six hours, and, more desirably, two hours to five hours. After that, precipitate is collected and is immersed into alcohol (methanol, ethanol), or the like, and is then left at rest for a half day to one week. By so doing, a redundant glycidyl group-containing (meth)acrylate mixed in the precipitate is removed. After that, the precipitate is dried normally at a temperature of 20° C. to 70° C., desirably, 30° C. to 60° C. Then, the polyaniline-added prepolymer may be collected.

The following reaction formula shows a manufacturing scheme of the polyaniline-added prepolymer according to the present embodiment.

[Chemical Formula 1]

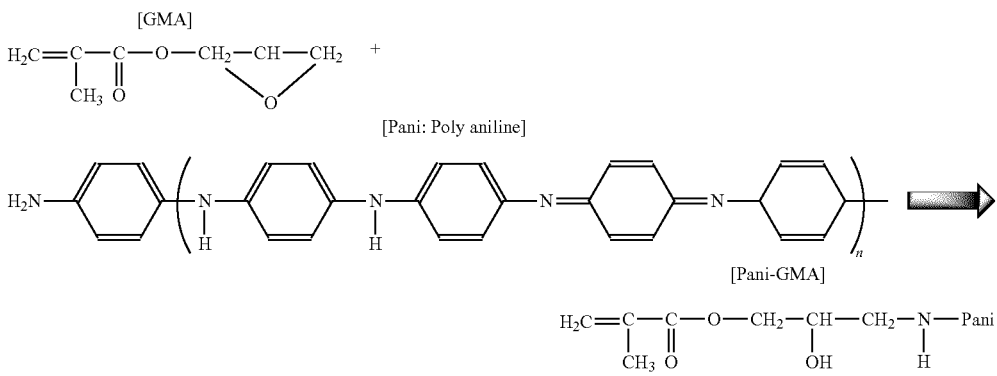

The reaction formula shows a reaction such that polyaniline (PANI) is added into glycidyl methacrylate (GMA) used as a glycidyl group-containing (meth)acrylate to synthesize polyaniline-added glycidyl methacrylate (PANI-GMA), which is a polyaniline-added prepolymer.

In addition, in manufacturing a polyaniline-added prepolymer according to a second embodiment of the invention, addition of polyaniline into isocyanate group-containing (meth)acrylate is achieved through reaction between the isocyanate group of the isocyanate group-containing (meth) acrylate and the amino group and/or imino group of the polyaniline. In this reaction, excessive amounts of the isocyanate group-containing (meth)acrylate is desirably added with respect to the polyaniline. The specific mixture mole ratio between both chemical compounds is, for example, such that the ratio of isocyanate group-containing (meth)acrylate to polyaniline is desirably 1000 to 2000:1, more desirably, 1200 to 1800:1, and, further desirably, 1300 to 1700:1. The reaction temperature is desirably 80° C. to 120° C., more desirably, 90° C. to 110° C., and further desirably, 95° C. to 100° C. In addition, the reaction duration is desirably one hour to six hours, and, more desirably, two hours to five hours.

The following reaction formula shows a manufacturing scheme of the polyaniline-added prepolymer according to the present embodiment.

[Chemical Formula 2]

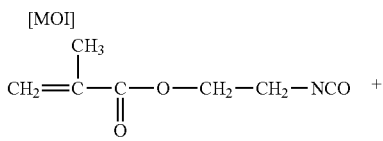

-continued

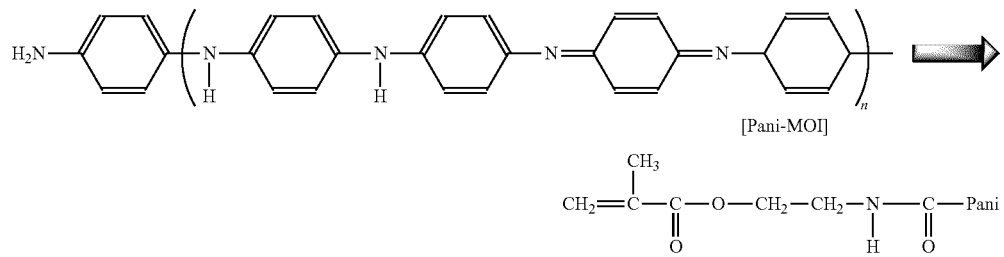

The reaction formula shows a reaction such that polyaniline (PANI) is added into 2-isocyanate ethyl(meth)acrylate (MOI) used as an isocyanate group-containing (meth)acrylate to synthesize polyaniline-added 2-isocyanate ethyl (meth)acrylate (PANI-MOI), which is a polyaniline-added prepolymer.

The polyaniline graft polymer according to the embodiment of the invention will be described. In the embodiment of the invention, the "polyaniline graft polymer" means a chemical compound (copolymer) that is obtained through additive copolymerization of the polyaniline-added prepolymer according to the embodiment of the invention and another unsaturated group-containing monomer at respective double bonds. Thus, the polyaniline graft polymer according to the embodiment of the invention normally has a structure such that a side chain that contains polyaniline and that is originated from the polyaniline-added prepolymer and a side chain originated from another unsaturated group-containing monomer are branched from a linear principal chain that is mainly composed of carbon.

In the embodiment of the invention, the "another unsaturated group-containing monomer" is not specifically limited as long as it is a chemical compound that contains an unsaturated bond, that is, a double bond or a triple bond. For example, a chemical compound that contains an unsaturated hydrocarbon radial (for example, a vinyl group, allyl group (2-propenyl group), isopropenyl group) corresponds to the above "another unsaturated group-containing monomer". Specifically, the chemical compound may be an acrylic unsaturated group-containing monomer. Among others, 2-hydroxyethyl(meth)acrylate, methyl(meth)acrylate, butyl (meth)acrylate, and acrylic acid are particularly desirable. In addition, a plurality of unsaturated bonds may be included in another unsaturated group-containing monomer.

The polyaniline graft polymer according to the embodiment of the invention may be a chemical compound that is obtained through additive copolymerization of two or more kinds of the polyaniline-added prepolymers according to the embodiment of the invention and two or more kinds of other unsaturated group-containing monomers at respective double bonds. Specifically, a copolymer of the polyaniline-added glycidyl(meth)acrylate (PANI-G(M)A), 2-hydroxyethyl (meth)acrylate, and methyl(meth)acrylate corresponds to the above chemical compound.

The polyaniline graft polymer according to the embodiment of the invention desirably have a weight-average molecular weight of 1,000 to 100,000. This is because, when a polymer has a weight-average molecular weight larger than or equal to 1,000, the polymer has a high long-term dispersibility to a solvent, and, when a polymer has a weight-average molecular weight smaller than or equal to 100,000, the polymer has a low viscosity and, similarly, has a high dispersibility to a solvent.

The polyaniline graft polymer according to the embodiment of the invention is able to dissolve or swell in various organic solvents. The polyaniline graft polymer according to the embodiment of the invention is able to exist in a paint or a coating in a state where polyaniline is grafted onto a paint resin or in a state where polyaniline graft polymers are cross-linked with a paint resin compound. Therefore, it is possible to solve the various problems (insoluble in a general organic solvent, difficult to form, poor dispersibility in a solvent, poor long-term dispersion stability in a coating, or the like) of the polyaniline according to the related art. Thus, it is possible to easily form, for example, a flexible and self-supported polymeric film having heat resistance and long-term stability, which has been impossible to manufacture or difficult to manufacture even when it is possible using the polyaniline compound according to the related art.

Particularly, in terms of the solvent dispersibility and long-term dispersion stability, the polyaniline graft polymer according to the embodiment of the invention is remarkably useful as a coating component of an anticorrosive paint. In addition, coatings and films formed of the polyaniline graft polymer according to the embodiment of the invention exhibit high electrical conductivity through doping, so the coatings and films are useful in various applications, such as an electronic material and a conductive material.

A method of manufacturing the polyaniline graft polymer according to the embodiment of the invention will be described below. The manufacturing method includes (1) a polyaniline-added prepolymer synthesizing step and (2) a polyaniline-added prepolymer addition polymerization step. Hereinafter, those steps will be described.

(1) The polyaniline-added prepolymer synthesizing step synthesizes a polyaniline-added prepolymer by adding polyaniline into glycidyl group- or isocyanate group-containing (meth)acrylate. This step is similar to the method of manufacturing the polyaniline-added prepolymer according to the embodiment of the invention, so the description thereof is omitted.

(2) The polyaniline-added prepolymer addition polymerization step carries out addition-copolymerization of the polyaniline-added prepolymer, obtained in the step (1), and another unsaturated group-containing monomer at their respective double bonds. In this steps, first, the polyaniline-added prepolymer according to the embodiment of the invention and another unsaturated group-containing monomer are added into a solvent by an adequate amount. Another unsaturated group-containing monomer is not specifically limited as long as it is a chemical compound that contains an unsaturated bond as described in the section of polyaniline graft polymer. The chemical compound is desirably 2-hydroxyethyl(meth)acrylate, methyl(meth)acrylate, and/or butyl(meth)acrylate, and/or acrylic acid. Particularly, 2-hydroxyethyl(meth)acrylate is desirable. In addition, the solvent may be, for example, an organic solvent, such as tetrahydrofuran (THF). The mixture ratio among polyaniline-added prepolymer, another unsaturated group-containing monomer and solvent is not specifically limited. For example, the mixture ratio by weight is desirably 1 to 5:5 to 15:20 to 100, and, more desirably, 1 to 3:7 to 12:30 to 60. Subsequently, a polymerization initiator (free-radial initiator) may be, for example, azobisisobutyronitrile (AIBN), or the like. The polymerization initiator-may be added with a concentration of normally 0.5 to 5 mol % and, desirably, 1 to 3 mol % with respect to the concentration of the mole percent of the another unsaturated group-containing monomer. The reaction temperature is desirably 50° C. to 100° C., more desirably, 60° C. to 90° C., and further desirably, 65° C. to 80° C. In addition, the reaction duration is desirably five hours to 24 hours, more desirably, eight hours to 20 hours, and, further more desirably, 10 hours to 15 hours.

The following reaction formula shows a manufacturing scheme of the polyaniline graft polymer according to the first embodiment of the invention.

[Chemical Formula 3]

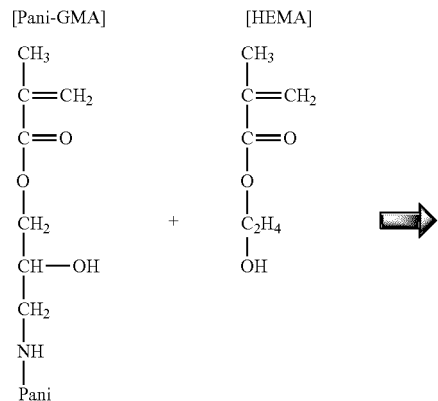

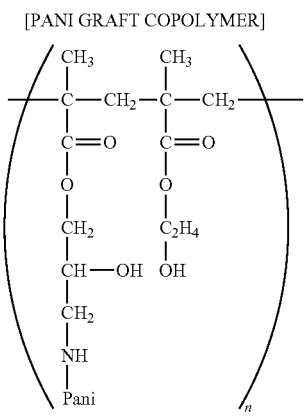

The reaction formula shows a reaction such that polyaniline-added glycidyl methacrylate (PANI-GMA), which is used as a polyaniline-added prepolymer, and 2-hydroxyethyl methacrylate (HEMA), which is an unsaturated acrylic monomer, are copolymerized to synthesize PANI-GMA-HEMA, which is the polyaniline graft polymer according to the present embodiment.

The polyaniline graft polymers according to the first embodiment of the invention may be cross-linked by a di-isocyanate compound to form a cross-linked material. The di-isocyanate compound may be, for example, an isocyanurate compound (BURNOCK DN-980 and/or DN-981 produced by DIC) or an adduct compound (D-750; BURNOCK DN-981 produced by DIC).

The cross-linking reaction is shown by the following reaction formula.

[Chemical Formula 4]

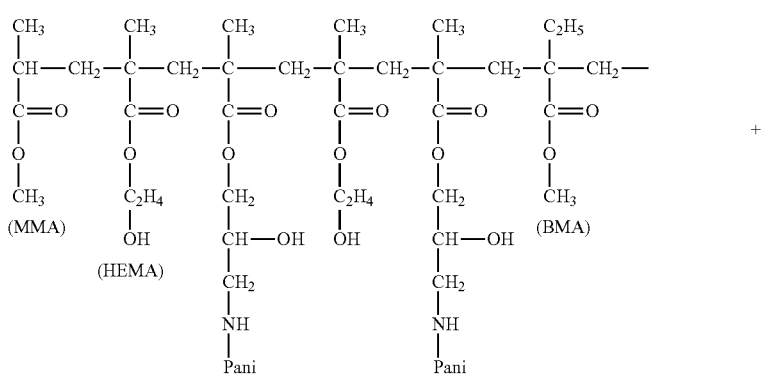

+

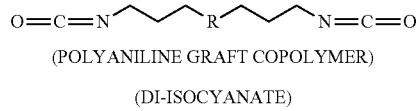
(POLYANILINE GRAFT COPOLYMER)
(DI-ISOCYANATE)

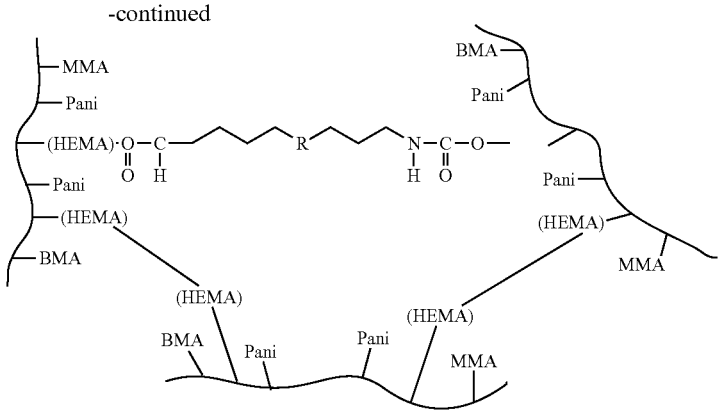

[CROSS-LINKED MATERIAL OF POLYANILINE GRAFT COPOLYMERS]

With the cross-linked material according to the present embodiment, polyaniline graft polymer are cross-linked by a di-isocyanate compound to improve solvent resistance and also improve coating physical property.

Note that a polyaniline graft polymer and a cross-linked material according to the second embodiment may be manufactured in such a manner that PANI-GMA is replaced with PANI-MOI in manufacturing the polyaniline graft polymer and the cross-linked material according to the first embodiment.

A paint according to the embodiment of the invention is a paint that contains the polyaniline graft polymer according to the above described embodiment of the invention as part or whole of coating forming component or a paint that contains the cross-linked material as part or whole of a coating forming component.

The polyaniline graft polymer according to the embodiment of the invention is soluble in an amide solvent, such as N-methyl-2-pyrrolidone and N,N-dimethylacetamide, a halogenated hydrocarbon solvent, such as chloroform, dichloroethane and dichloromethane, an ether solvent, such as tetrahydrofuran, an amine solvent, such as pyridine, and a polar solvent, such as dimethyl sulfoxide. A coating or a self-supported film may be manufactured from the above solution. Furthermore, the coating or the film is doped with an acceptor dopant to exhibit a high electrical conductivity of $10^{-3}$ to $10$ S/cm.

The dopant used here is not specifically limited. Any dopants may be used as long as it may be used as a dopant when an aniline conductive polymer is doped. Specific examples may be various chemical compounds. The chemical compounds include a halogen, such as iodine, bromine, chlorine and iodine trichloride, a proton acid, such as sulfuric acid, hydrochloric acid, nitric acid, perchloric acid and fluoboric acid, various salts of the proton acids, a Lewis acid, such as aluminum trichloride, iron trichloride, molybdenum chloride, antimony chloride and arsenic pentafluoride, and an organic acid, such as acetic acid, trifluoroacetic acid, benzenesulfonic acid and p-toluenesulfonic acid.

A method of doping these chemical compounds is not specifically limited. A known method may be applied to the doping method. Generally, it is only necessary to bring a coating or film of polyaniline graft polymer into contact with a dopant compound, and the contact may be carried out in a vapor phase or in a liquid phase. Alternatively, a method of electrochemically doping a coating or film of polyaniline graft polymer in the proton acid or a solution of the proton acid salt may be used.

With the paint according to the present embodiment, different from the paint that contains polyaniline according to the related art, it is possible to provide a paint having high solvent dispersibility and long-term dispersion stability as an anticorrosive paint and a conductive coating forming paint.

Hereinafter, examples of the invention will be described; however, the examples are only illustrative and are not intended to limit the scope of the invention.

FIRST EXAMPLE

Prepolymerization of PANI and GMA

A polyaniline prepolymer was manufactured in accordance with the synthesizing procedure shown by the reaction formula.
Synthesizing Procedure
i) Charge PANI and GMA into a flask by predetermined amounts (see Table 1).
ii) Add a solvent (DMF, NMP) by a predetermined amount (see Table 1). When there is no solvent, skip this step.
iii) Undergo a reaction under the reaction condition shown in Table 1.
iv) Charge precipitate into three liters of methanol, and leave it at rest for three days.
v) Dry the precipitate at a temperature of 50° C. for 24 hours.

TABLE 1

Macromonomerization of PANI and GMA

| | PA-GMA-1 | | PA-GMA-2 *1 | | PA-GMA-3 *1 | | PA-GMA-4 *1 | |
|---|---|---|---|---|---|---|---|---|
| | g | mmol | g | mmol | g | mmol | g | mmol |
| PAN | 2.00 | 0.40 | 5.00 | 1.00 | 5.00 | 1.00 | 5.00 | 1.00 |
| GMA | 0.057 | 0.40 | 0.14 | 0.98 | 0.7 | 4.92 | 1.4 | 9.85 |

TABLE 1-continued

Macromonomerization of PANI and GMA

| | | | | | | | | |
|---|---|---|---|---|---|---|---|---|
| DMF | 40 | | | | | | | |
| NMP | | | 245 | | 245 | | 245 | |
| Reaction Condition | 100° C. × 3 h | | 100° C. × 3 h | | 100° C. × 3 h | | 100° C. × 3 h | |
| Results *2 | Insufficient | | Insufficient | | Insufficient | | Insufficient | |

| | PA-GMA-5 *1 | | PA-GMA-6 | | PA-GMA-7 | | PA-GMA-8 | |
|---|---|---|---|---|---|---|---|---|
| | g | mmol | g | mmol | g | mmol | g | mmol |
| PAN | 5.00 | 1.00 | 0.50 | 0.10 | 0.50 | 0.10 | 15.30 | 3.06 |
| GMA | 16.4 | 115.37 | Excessive Amount | | 25.0 | 175.87 | 765.0 | 5382 |
| DMF | | | | | | | | |
| NMP | 245 | | | | | | | |
| Reaction Condition | 100° C. × 3 h | | 100° C. × 3 h | | 100° C. × 3 h | | 100° C. × 3 h | |
| Results *2 | Insufficient | | Good | | Good | | Good | |

*1: GMA is added for PA-GMA-2 TO 5 to check reaction.
*2: Determination is made on the basis of whether there is a double bond of GMA in NMR.
*3: PA-G-7 is a reproducibility test of PA-G-6.
*4: PA-G-8 is a scale up of PA-G-7.

The precipitate was evaluated by H-NMR (C═C bonds of the benzene rings were checked around 7 ppm, and C═C bonds were checked around 6 ppm). The results showed that no peak of double bonds of GMA was identified in NMR when the additive amount of GMA was insufficient, and double bonds of GMA were identified when the additive amount of GMA was increased.

Figure 2:
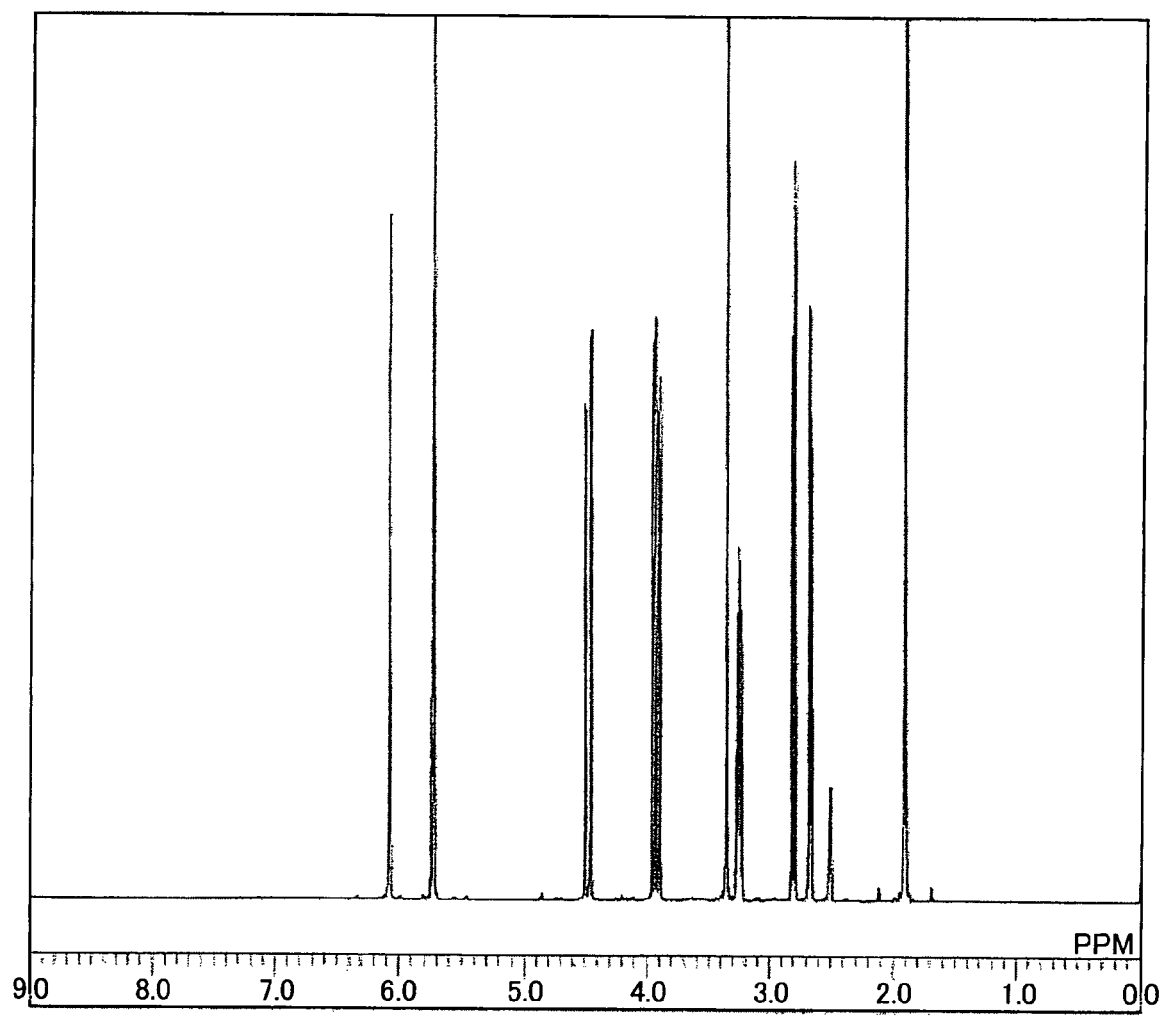
FIG. 2 shows an NMR of GMA only.
Figure 3:
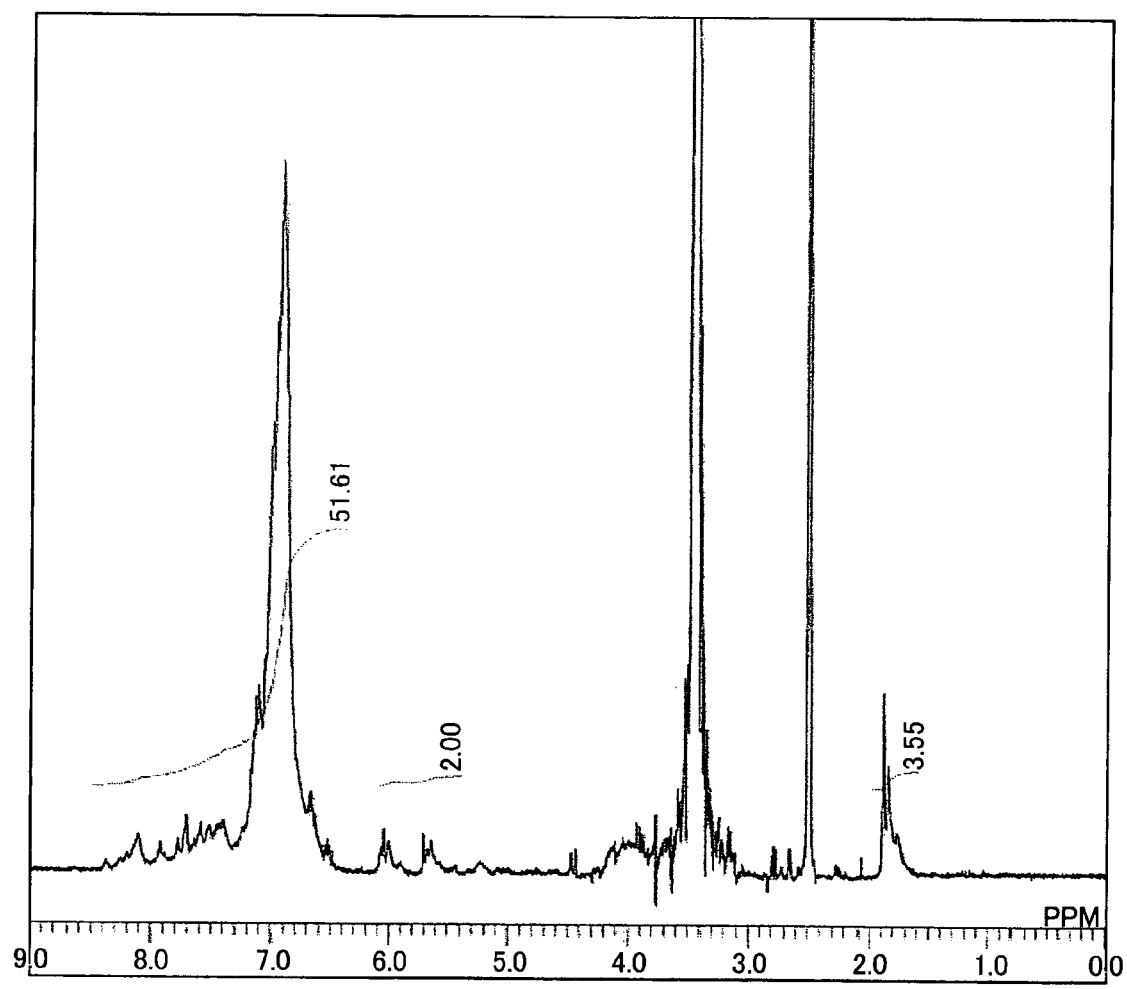
FIG. 3 shows an NMR of PANI-GMA-7.

FIG. 1 to FIG. 3 show respective NMRs of PANI only, GMA only, and PANI-GMA-7. The peak of benzene rings around 7 ppm in FIG. 3 indicates that about 13 benzene rings are added per each C═C (51.61/4=12.7). In addition, PANI used for synthesis has a weight-average molecular weight of 5000, and PANI (5000) includes about 55 benzene rings (5000/91=54.9). Assuming that PANI molecules are not cleaved during reaction, it is expected that about four GMA molecules are bonding (54.9/12.7=4.32) per one PANI molecule from the results of NMR. It is presumed that the glycidyl group of GMA not reacts with both terminals of PANI but reacts with the imino group (—NH—) in the middle of PANI to graft GMA.

SECOND EXAMPLE

Copolymerization of PANI-GMA and Vinyl Monomer

A polyaniline graft polymer was manufactured in accordance with the synthesizing procedure shown by the reaction formula.

Synthesizing Procedure i) Charge PANI-GMA into a flask by a predetermined amount (see Table 2).

ii) Charge a vinyl monomer (HEMA, MMA, BMA, AA, or the like) into the flask by a predetermined amount (see Table 2).

iii) Add a solvent (THF) by a predetermined amount (see Table 2).

iv) Add AIBN by a predetermined amount (see Table 2) so that the concentration of AIBN with respect to each vinyl monomer is 2 mol %.

v) Undergo a reaction under the reaction condition shown in Table 2.

vi) Charge precipitate into three liters of methanol, and leave it at rest for three days.

TABLE 2

Copolymerization of PANI-GMA and Resin Monomer (HEMA, MMA, BMA, AA)

| | | | | | | | | |
|---|---|---|---|---|---|---|---|---|
| PAN-GMA | 1.0 g | | 1.0 g | | 1.0 g | | 1.0 g | |
| MMA | 9.0 g | 89.9 mmol | | | | | | |
| BMA | | | 9.0 g | 63.3 mmol | | | | |
| HEMA | | | | | 9.0 g | 69.2 mmol | | |
| AA | | | | | | | 9.0 g | 124.9 mmol |
| AIBN | 0.2952 g | 1.80 mmol | 0.2079 g | 1.27 mmol | 0.2271 g | 1.38 mmol | 0.4102 g | 2.50 mmol |
| THF | 40 g | | 40 g | | 40 g | | 40 g | |
| Reaction Condition | 70° C. × overnight | | 70° C. × overnight | | 70° C. × 10 h | | 70° C. × 10 h | |
| Results *1 | Good Good Filterability | | Good Insufficient Filterability Decantation | | Good Insufficient Filterability Centrifugal Separation | | Insufficient Insufficient Settled as a lump | |

TABLE 2-continued

Copolymerization of PANI-GMA and Resin Monomer (HEMA, MMA, BMA, AA)

| Yield | 3 g (30%) | 2.5 g (25%) | 3.7 g (37%) | 11.6 g (116%) |
|---|---|---|---|---|
| Molecular Weight | Mn = 14811 | Mn = 22005 | Mn = 17119 | |
| | Mw = 26373 | Mw = 34325 | Mw = 33350 | |
| | Mw/Mn = 1.781 | Mw/Mn = 1.560 | Mw/Mn = 1.948 | |

*1: Determination is made on the basis of whether there is precipitation of polymer when charged into methanol and measurement result of NMR. Only AA is charged into n-Hex.
Starting Agent Concentration: 2 mol % with respect to vinyl monomer
Reaction Concentration: 20 wt %

The precipitate was evaluated by H-NMR (C=C bonds of the benzene rings were checked around 7 ppm, and C=C bonds were checked around 6 ppm). In addition, the molecular weight of the precipitate was measured by GPC.

Figure 4:
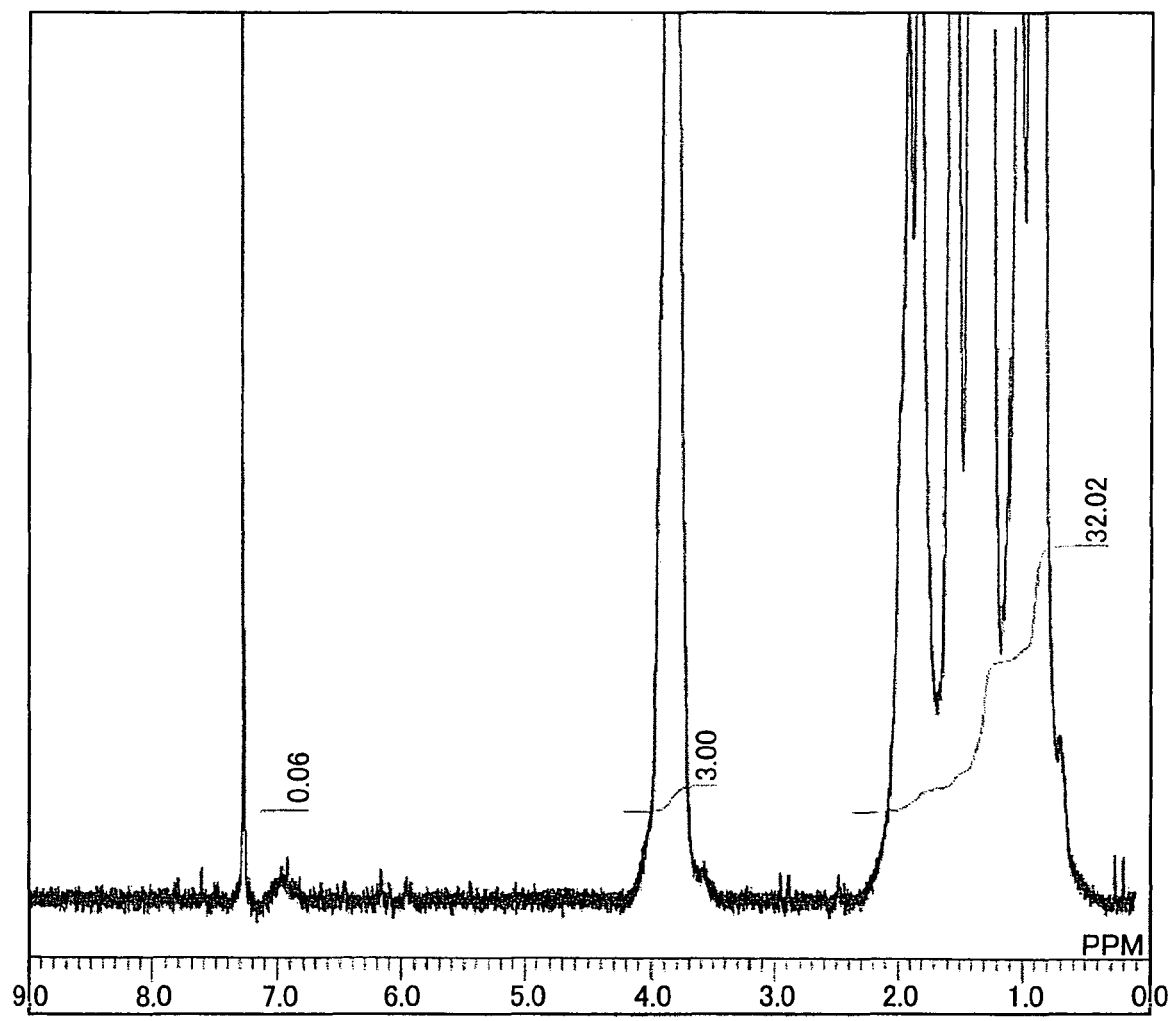
FIG. 4 shows an NMR of PANI-GMA/HEMA.
Figure 5:
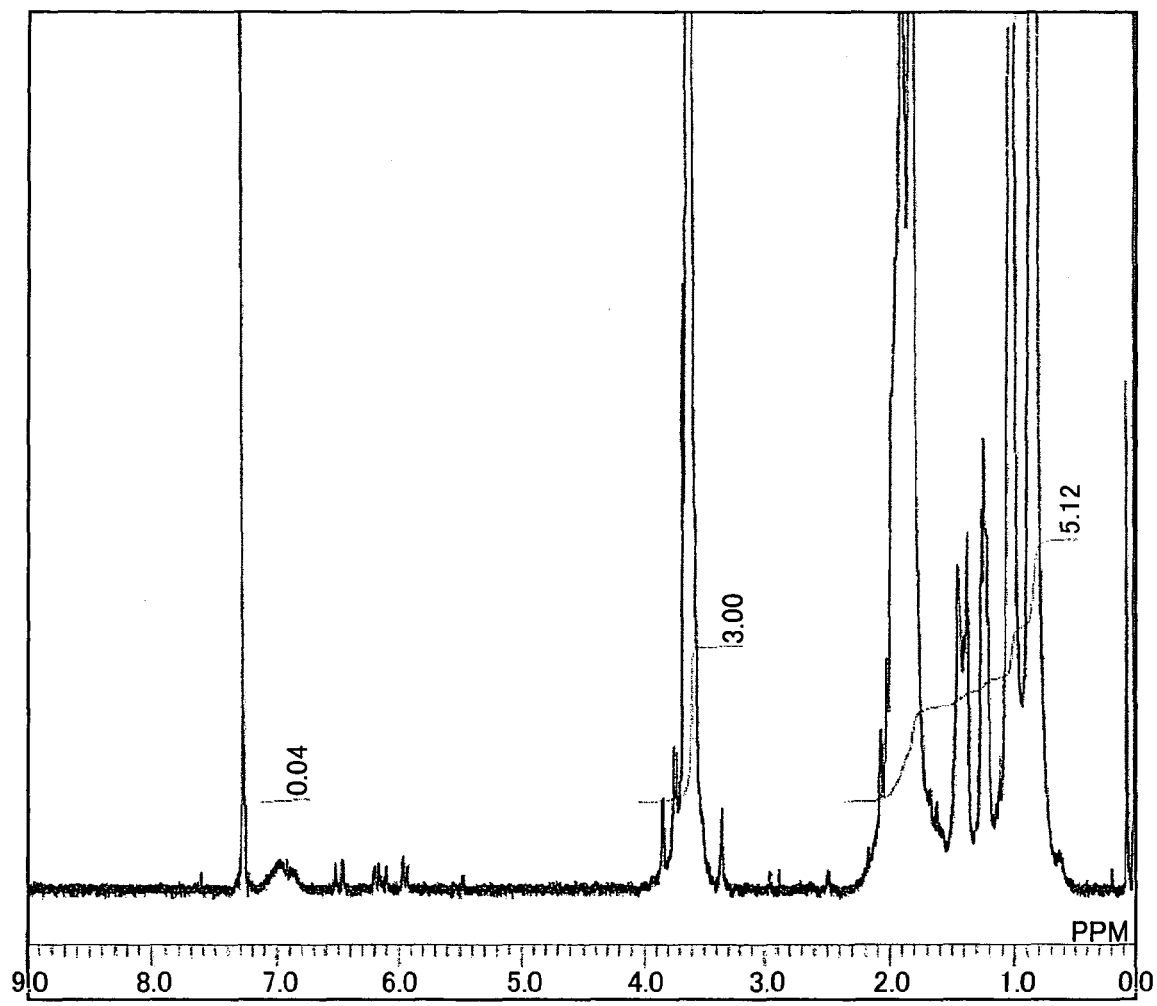
FIG. 5 shows an NMR of PANI-GMA/MMA.
Figure 6:
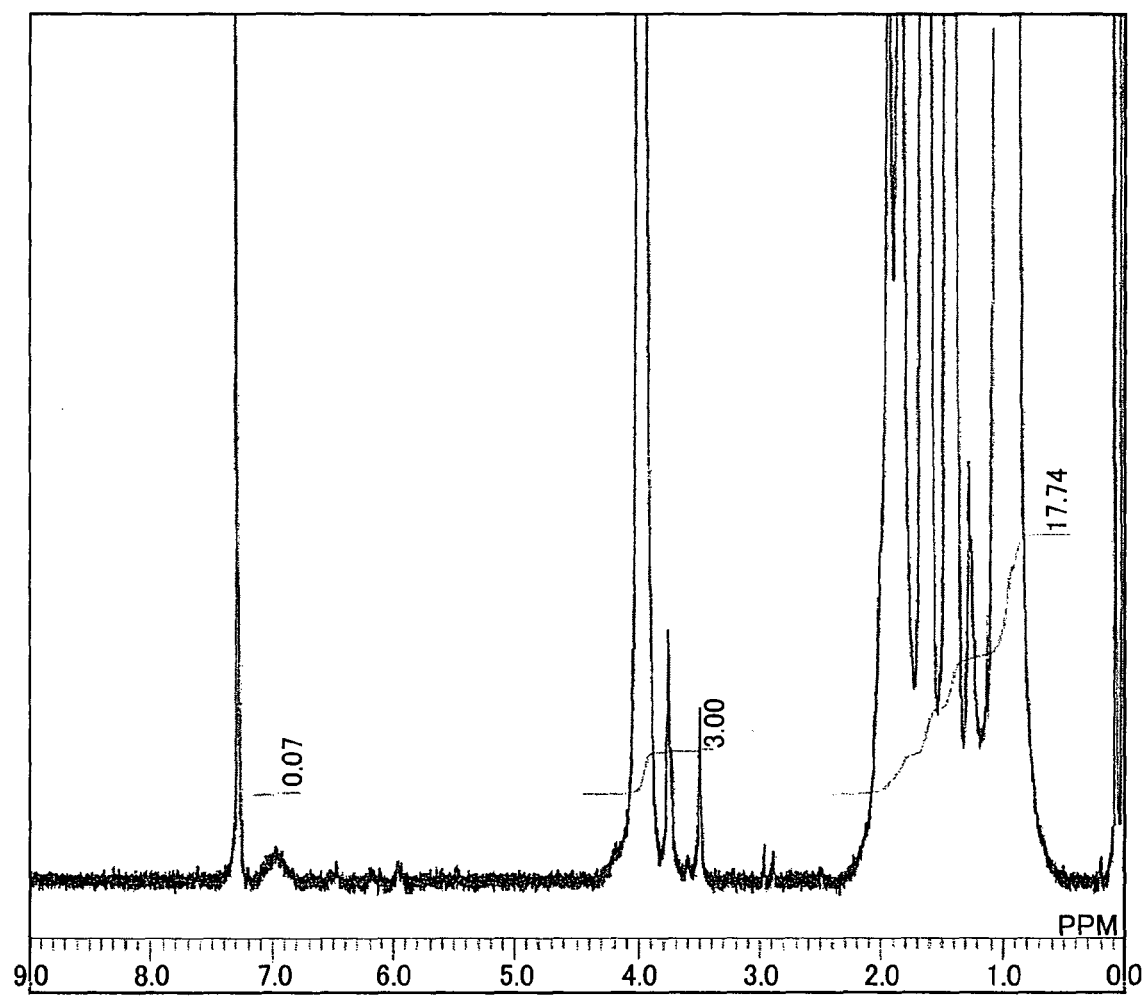
FIG. 6 shows an NMR of PANI-GMA/BMA.

Other than AA, the peak of double bonds disappear in NMR, so it is presumed that double bonds were used for addition polymerization. FIG. 4 to FIG. 6, from which double bonds of GMA were identified because of an increase in additive amount, show respective NMRs of PANI-GMA/HEMA, PANI-GMA/MMA and PANI-GMA/BMA.

THIRD EXAMPLE

Prepolymerization of PANI and Resin Monomer (2-Methacryloyloxyethyl Isocyanate)

2-isocyanate ethyl(meth)acrylate (Karenz MOI (Registered Trademark)), which is represented by the following chemical formula and has an NCO group at its terminal, was used instead of GMA to attempt prepolymerization.

{[Chemical Formula 5]}

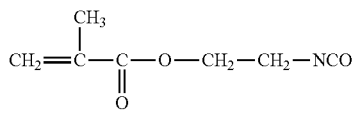

Karenz MOI
[2isocyanate ethyl methacrylate]
Mw=155.5

The prepolymerization was conducted in the following synthesizing procedure.
i) Charge PANI and Karenz MOI into a flask by predetermined amounts (see Table 3).
ii) Undergo a reaction under the reaction condition shown in Table 3.
iii) Charge precipitate into three liters of methanol, and leave it at rest for three days (remove redundant GMA).
iv) Dry the precipitate at a temperature of 50° C. for 24 hours.

TABLE 3

| | PA-NCO-1 | |
|---|---|---|
| | g | mmol |
| PAN | 0.50 | 0.10 |
| MOI *1 | 25.0 | 161.13 |
| DMF | | |
| NMP | | |
| ° C. | | 100 |
| Results *2 | | Good |

*1: Karenz MOI (2-isocyanate ethyl methacrylate)
*2: Determination is made on the basis of whether there is a double bond of GMA in NMR.

The precipitate was evaluated by H-NMR (C=C bonds of the benzene rings were checked around 6 ppm). The results showed that, as in the case of GMA, C=C bonds originated from the benzene rings of PANI and C=C bonds of MOI ware identified.

Figure 7:
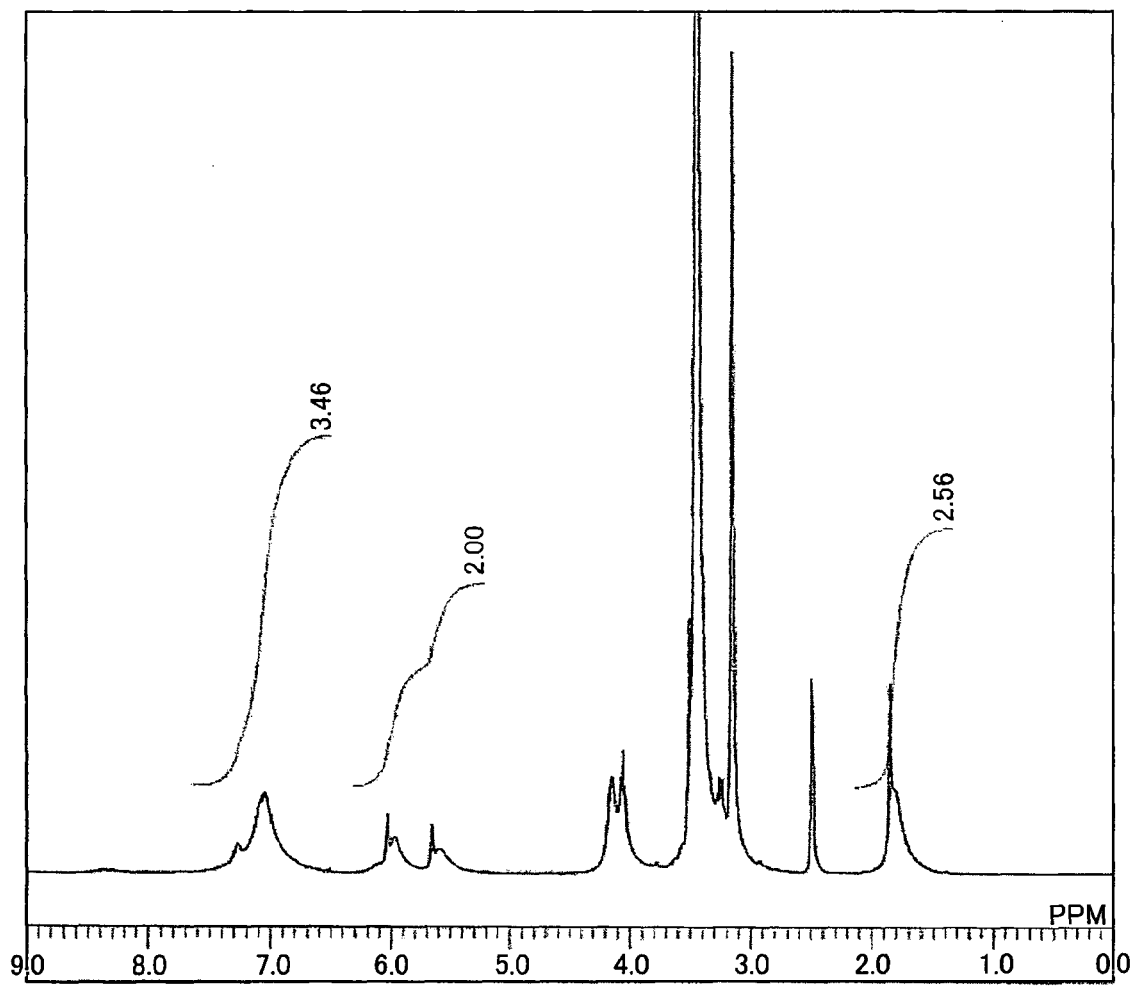
FIG. 7 shows an NMR of PANI-MOI.

FIG. 7 shows an NMR of PANI-MOI. The peak of benzene rings around 7 ppm in FIG. 7 indicates that about one benzene ring is added per each C=C (3.46/4=0.865). PANI used for synthesis has a weight-average molecular weight of 5000, and PANI (5000) includes about 55 benzene rings (5000/91=54.9). Assuming that PANI molecules are not cleaved during reaction, it is expected that about 63 GMA molecules are bonding (54.9/0.865=63.45) per one PANI molecule from the results of NMR. It is presumed that MOI not only reacts with both terminals of each PANI but also all the imino groups (—NH—) in the middle of each PANI to graft MOI.

By incorporating the PANI-GMA/HEMA, PANI-GMA/MMA, PANI-GMA/BMA or PANI-MOI into a paint resin and a paint manufacturing process, it may be contained in a paint or a coating in a state where polyaniline is grafted onto a paint resin or in a state where polyaniline graft polymers are cross-linked with a paint resin. This significantly improves stability of polyaniline in a paint and dispersibility of polyaniline in a coating.

FOURTH EXAMPLE

Cross-Linking of PANI Graft Polymers by Di-Isocyanate Compound

Polyaniline graft polymers were cross-linked by a di-isocyanate compound through a cross-linking reaction shown by the above chemical formula. The di-isocyanate compounds used were (1) isocyanurate type (BURNOCK DN-980; HDI series, produced by DIC), (2) isocyanurate type (BURNOCK DN-981; HDI series, produced by DIC) and (3) adduct type (BURNOCK DN-750; TDI series, produced by DIC).

Figure 8:
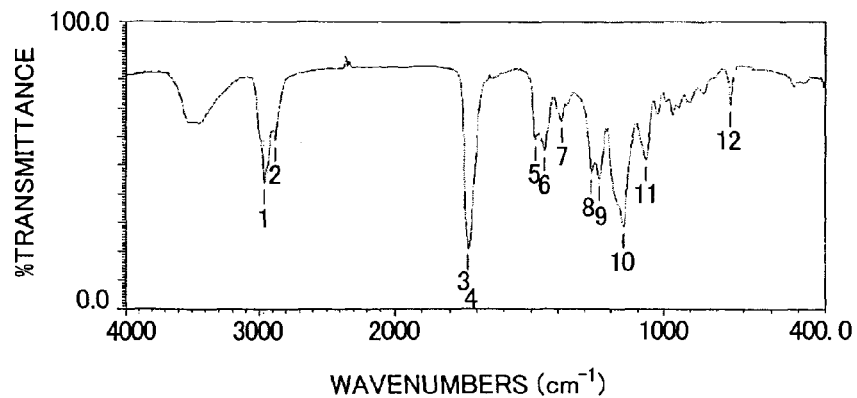
FIG. 8 shows IRs before and after reaction when DN-981 was used as a cross-linking agent.
Figure 8:
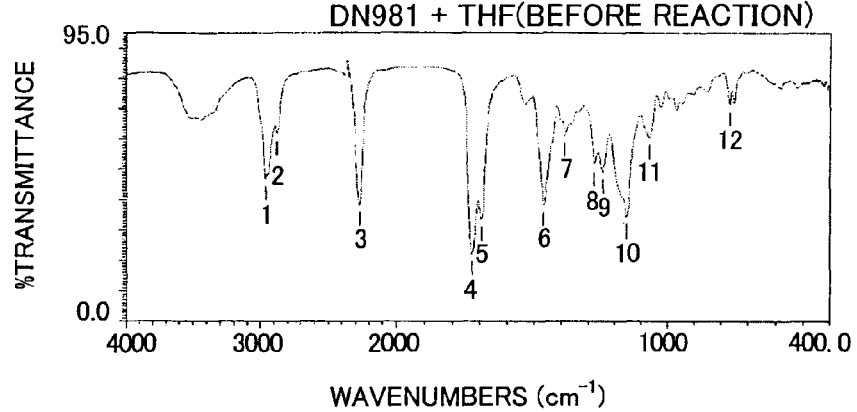
Figure 8:
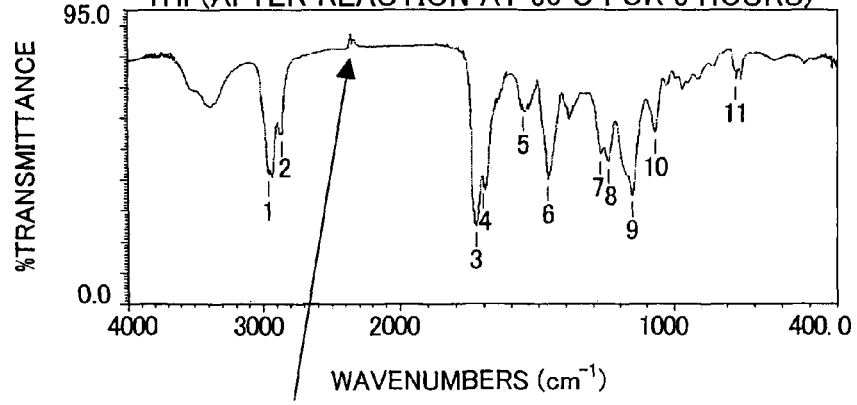

Actually, whether —OH of HEMA reacts with —NCO of di-isocyanate was checked by IR. FIG. 8 shows IRs before and after reaction when DN-981 was used as a cross-linking agent. The results showed that absorption by —NCO disappeared and —OH of HEMA reacted with —NCO of di-isocyanate.

Figure 9:
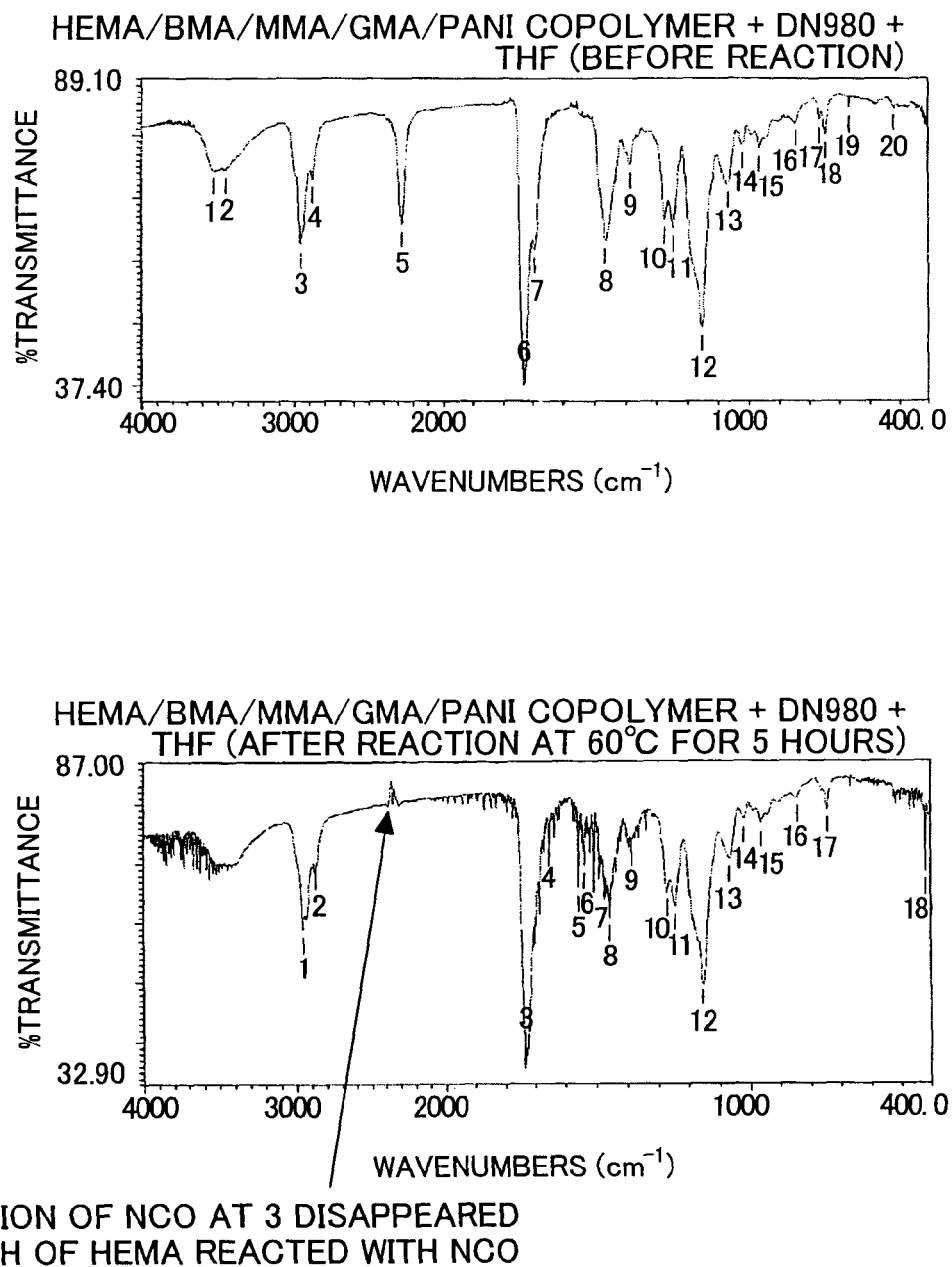
FIG. 9 shows IRs before and after reaction when DN-980 was used as a cross-linking agent.
Figure 10:
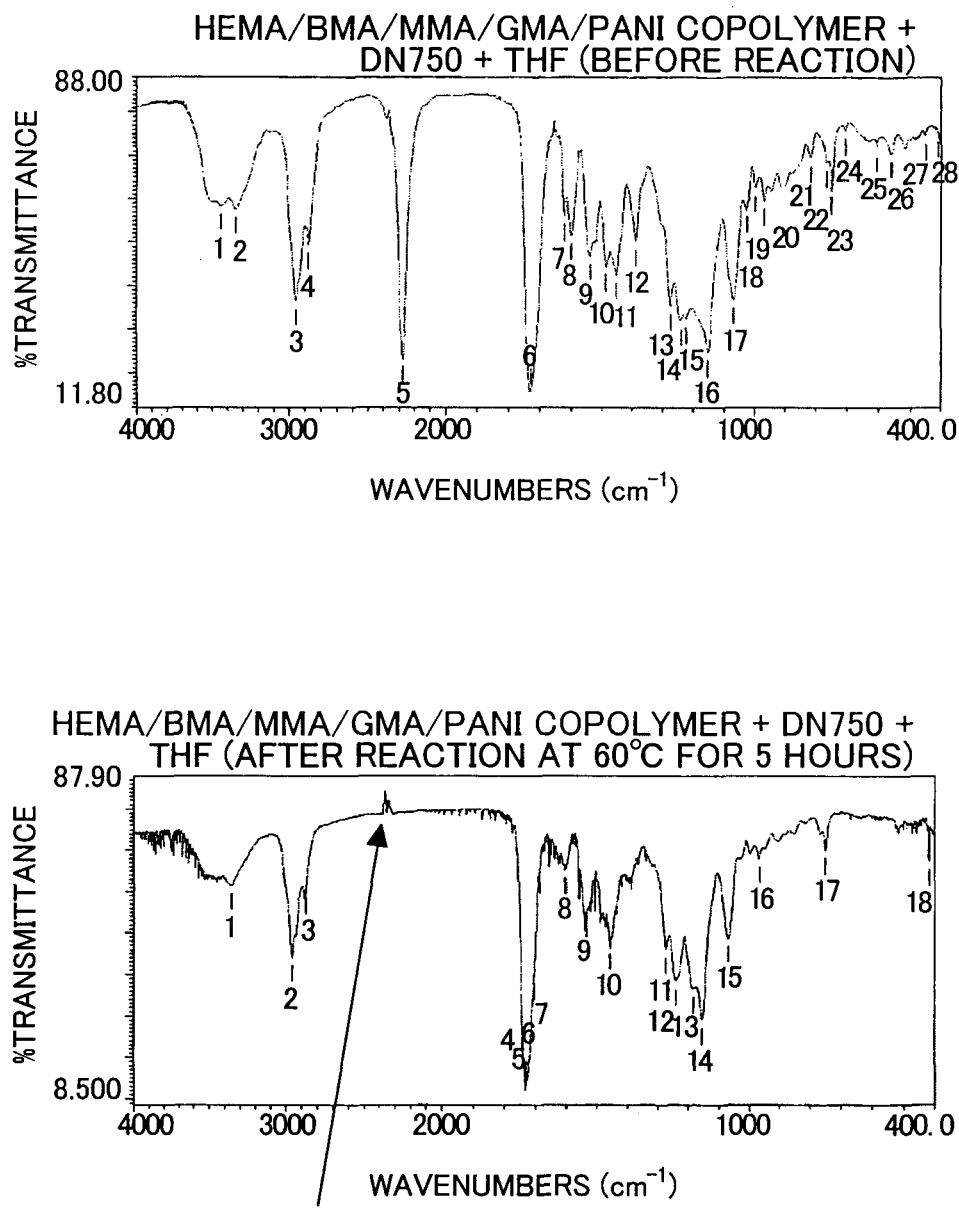
FIG. 10 shows IRs before and after reaction when DN-750 was used as a cross-linking agent.

Similarly, FIG. 9 shows IRs before and after reaction when DN-980 was used as a cross-linking agent. The results showed that absorption by —NCO disappeared and —OH of HEMA reacted with —NCO of di-isocyanate. FIG. 10 shows IRs before and after reaction when DN-750 was used as a cross-linking agent. The results showed that absorption by —NCO disappeared and —OH of HEMA reacted with —NCO of di-isocyanate.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The polyaniline graft polymer according to the aspect of the invention, which is obtained by addition-polymerizing a polyaniline-added prepolymer, may be particularly applied as a coating component of an anticorrosive paint. In addition, coatings or films that contain the polyaniline graft polymer exhibit high conductivity through doping, so the coatings or the films may be applied to an electronic material, a conductive material, or the like.

The invention claimed is:

1. A polyaniline graft polymer comprising:
   (a) the polyaniline-added prepolymer characterized by comprising of a (meth)acrylate that contains an isocyanate group and to which polyaniline is added, so that the (meth)acrylate is chemically bound to the polyaniline via or urea moiety, respectively, in a first step; and
   (b) another monomer that contains an unsaturated group and that undergoes additive copolymerization with the polyaniline-added prepolymer according to (a), wherein
   (c) the additive copolymerization is carried out between double bonds of the molecules according to (a) and (b) in a second step; and
   wherein the (meth)acrylate that contains the isocyanate group is a 2-isocyanate ethyl (meth)acrylate.

2. The polyaniline graft polymer according to claim 1, wherein the polyaniline graft polymer has a weight-average molecular weight of 1,000 to 100,000.

3. The polyaniline graft polymer according to claim 1, wherein the another monomer (b) is selected from the group consisting of 2-hydroxyethyl (meth)acrylate, methyl (meth)acrylate, butyl (meth)acrylate and acrylic acid.

4. A method of manufacturing a polyaniline graft polymer comprising:
   (a) synthesizing a polyaniline-added prepolymer by adding polyaniline into a (meth)acrylate that contains an isocyanate group, so that the (meth)acrylate is chemically bound to the polyaniline via a or urea moiety, respectively, in a first step; and
   (b) carrying out additive copolymerization of the synthesized polyaniline added prepolymer and another monomer that contains an unsaturated group, wherein
   (c) the additive copolymerization is carried out between double bonds of the molecules mentioned under (b) in a second step; and
   wherein the (meth)acrylate that contains the isocyanate group is a 2-isocyanate ethyl (meth)acrylate.

5. The method according to claim 4, wherein the another monomer is selected from the group consisting of 2-hydroxyethyl (meth)acrylate, methyl (meth)acrylate, butyl (meth)acrylate and acrylic acid.

6. A method of manufacturing a polyaniline graft polymer comprising:
   (a) synthesizing a polyaniline-added prepolymer by adding polyaniline into a (meth)acrylate that contains an isocyanate group, so that the (meth)acrylate is chemically bound to the polyaniline via a or urea moiety, respectively, in a first step; and
   (b) carrying out additive copolymerization of the synthesized polyaniline added prepolymer and another monomer that contains an unsaturated group, wherein
   (c) the additive copolymerization is carried out between double bonds of the molecules mentioned under (b) in a second step, wherein
   the polyaniline graft polymers according to claim 1 are crosslinked by a di-isocyanate compound; and
   wherein the (meth)acrylate that contains the isocyanate group is a 2-isocyanate ethyl (meth)acrylate.

7. A paint comprising a coating forming component that contains the polyaniline graft polymer according to claim 1.

8. A paint comprising a coating forming component that contains the cross-linked polyaniline graft polymers according to claim 6.

* * * * *

UNITED STATES PATENT AND TRADEMARK OFFICE
CERTIFICATE OF CORRECTION

PATENT NO. : 8,546,495 B2  
APPLICATION NO. : 13/146658  
DATED : October 1, 2013  
INVENTOR(S) : Yu Takada et al.

Page 1 of 1

It is certified that error appears in the above-identified patent and that said Letters Patent is hereby corrected as shown below:

On the Title Page, Item (73), the "Assignee" should read:

--Toyota Jidosha Kabushiki Kaisha,
  Toyota-shi, Aichi-ken (JP)
  Nard Institute, Ltd.
  Amagasaki, Hyogo-ken (JP)--.

Signed and Sealed this
Second Day of February, 2016

Michelle K. Lee
*Director of the United States Patent and Trademark Office*